Patented Jan. 4, 1944

2,338,433

UNITED STATES PATENT OFFICE 2,338,433

SALT BATH FOR HEATING SOLDERING IRONS

Artemas F. Holden, Northford, Conn.

No Drawing. Application September 12, 1941,
Serial No. 410,582

2 Claims. (Cl. 252—71)

The present invention relates to a salt bath for heating soldering irons.

The usual method for heating of soldering irons is the utilization of a blow torch or a small forge. The iron is placed in the flames and receives heat therefrom. The operation usually occurs in atmosphere. Soldering irons are usually copper and since the heating occurs in air, the copper quickly oxidizes over the portions not covered by tin or solder adhering to the soldering head. This oxide slowly works beneath the tinned portion of the iron head and eventually it becomes necessary to file the surface of the iron to obtain a bright surface which then requires retinning.

The salt bath of the present invention is of such consistency that no oxidation of the copper occurs and any oxide on the soldering head is quickly reduced by the bath; furthermore, the temperature can be controlled within definite limits for the best heat for soldering operations.

After the soldering head of the soldering iron has been duly heated, it is removed from the bath and may be dipped into a water bath which may contain a suitable percentage of zinc chloride, or other scavenging agents. The time of immersion of the head of the soldering iron is very short, usually about one second duration, and is merely sufficient to remove the salt bath film in order that the same may not be carried into the work where the soldering is taking place. This quick quench in the water solution is not sufficient to substantially cool the iron.

The present bath is intended for working at temperatures from around 850° F. to 1200° F. In general, the most preferred temperature for soldering is approximately 1000° F.

The present invention comprises a composition wherein an alkali metal chloride, an alkali metal cyanide, alkali metal carbonates, and an alkali metal fluoride, are fused together and permitted to cool, then are broken into suitable chunks which may be marketed in package form for remelting in a salt bath kettle or pot in the manner well known in connection with salt baths.

The present salt bath for use in heating soldering irons, particularly those made of copper, comprises 20% to 40% potassium chloride, 22% to 45% sodium cyanide, 15% to 35% sodium carbonate, 17% to 37% potassium carbonate, and 1% to 10% sodium fluoride.

More especially, the preferred formula is 33 parts potassium chloride, 37 parts sodium cyanide, 27 parts sodium carbonate, 28 parts potassium carbonate, and 5 parts sodium fluoride.

The above composition, when fused together and thoroughly mixed, after being permitted to cool and broken into chunks to be remelted, comprises a salt bath wherein no oxidation of copper will occur and any oxide which forms on the iron while in use is quickly reduced when the iron is re-inserted in the salt bath for re-heating. Therefore, the soldering head will remain bright and clean and will retain a larger area fully tinned than will occur where the same irons are heated by a forge or a torch.

By the use of the present invention, the soldering iron may be used more efficiently and satisfactorily because it is at all times bright and clean and at the most effective temperature for soldering operations.

What I claim is:

1. A salt bath for heating soldering irons consisting of an alkali metal chloride 20% to 40%, an alkali metal cyanide 22% to 45%, alkali metal carbonates 32% to 72% and an alkali metal fluoride 1% to 10%.

2. A salt bath for heating soldering irons having a working temperature from 900° F. to 1200° F. consisting of 20% to 40% potassium chloride, 22% to 45% sodium cyanide, 15% to 35% sodium carbonate, 17% to 37% potassium carbonate and 1% to 10% sodium fluoride.

ARTEMAS F. HOLDEN.